United States Patent
Dassori

(10) Patent No.: US 7,166,209 B2
(45) Date of Patent: *Jan. 23, 2007

(54) HYDROPROCESSING PROCESS

(75) Inventor: Carlos Gustavo Dassori, Los Teques (VE)

(73) Assignee: Intevep, S.A., Caracas (VE)

( * ) Notice: Subject to any disclaimer, the term of this patent is extended or adjusted under 35 U.S.C. 154(b) by 325 days.

This patent is subject to a terminal disclaimer.

(21) Appl. No.: 10/719,590

(22) Filed: Nov. 21, 2003

(65) Prior Publication Data

US 2004/0134837 A1 Jul. 15, 2004

Related U.S. Application Data

(63) Continuation-in-part of application No. 09/960,442, filed on Sep. 24, 2001, now Pat. No. 6,656,348, which is a continuation-in-part of application No. 09/797,448, filed on Mar. 1, 2001, now Pat. No. 6,649,042.

(51) Int. Cl.
*C10G 45/00* (2006.01)

(52) U.S. Cl. ............... 208/210; 208/213; 208/227; 208/57

(58) Field of Classification Search ............ 208/210, 208/213, 227, 57
See application file for complete search history.

(56) References Cited

U.S. PATENT DOCUMENTS

| | | | |
|---|---|---|---|
| 4,877,647 A | 10/1989 | Klabunde | |
| 5,110,444 A | 5/1992 | Haun et al. | |
| 5,183,556 A | 2/1993 | Reilly et al. | |
| 5,292,428 A | 3/1994 | Harrison et al. | |
| 5,705,052 A | 1/1998 | Gupta | |
| 5,759,939 A | 6/1998 | Klabunde et al. | |
| 5,925,239 A | 7/1999 | Klein et al. | |
| 5,928,498 A | 7/1999 | McVicker et al. | |
| 5,935,420 A | 8/1999 | Baird et al. | |
| 5,939,031 A | 8/1999 | Ellis et al. | |
| 5,968,346 A | 10/1999 | Jung et al. | |
| 5,985,131 A | 11/1999 | Gupta et al. | |
| 5,985,136 A | 11/1999 | Brignac et al. | |
| 6,007,787 A | 12/1999 | Gupta et al. | |
| 6,017,443 A | 1/2000 | Buchanan | |
| 6,087,294 A | 7/2000 | Klabunde et al. | |

FOREIGN PATENT DOCUMENTS

EP 1 236 788 9/2002
EP 1 295 932 3/2003

*Primary Examiner*—Thuan Dinh Dang
(74) *Attorney, Agent, or Firm*—Bachman & LaPointe, P.C.

(57) ABSTRACT

A process for hydroprocessing a hydrocarbon feedstock includes the steps of providing a hydrocarbon feed having an initial characteristic; providing a first hydrogen-containing gas; feeding the hydrocarbon feed and the first hydrogen-containing gas cocurrently to a first hydroprocessing zone so as to provide a first hydrocarbon product; providing a plurality of additional hydroprocessing zones including a final zone and an upstream zone; feeding the first hydrocarbon product cocurrently with a recycled gas to the upstream zone so as to provide an intermediate hydrocarbon product; and feeding the intermediate hydrocarbon product cocurrently with a second hydrogen-containing gas to the final zone so as to provide a final hydrocarbon product having a final characteristic which is improved as compared to the initial characteristic.

10 Claims, 7 Drawing Sheets

HYDROPROCESSING PROCESS

CROSS-REFERENCE TO RELATED APPLICATIONS

This application is a continuation-in-part of U.S. patent application Ser. No. 09/960,442, filed Sep. 24, 2001, now U.S. Pat. No. 6,656,348, which is a continuation-in-part of U.S. patent application Ser. No. 09/797,448 filed Mar. 1, 2001, now U.S. Pat. No. 6,649,042.

BACKGROUND OF THE INVENTION

The invention relates to a deep hydroprocessing process and, more particularly, to a process for effectively treating a hydrocarbon feedstock, especially for hydrocoversion processes such as processes for removing contaminant such as sulfur from hydrocarbon feedstocks.

A persistent problem in the art of petroleum refining is to reach acceptably low levels of contaminants such as sulfur and others.

A large portion of the world's hydrocarbon reserves contain sulfur, and removal of this sulfur is critical in order to provide acceptable fuels.

Government agencies are currently formulating new regulations which will require sulfur content in fuels to be substantially lower than current practice. It is expected that such regulations will require sulfur content of less than 15 wppm.

A number of processes have been attempted for use in removing sulfur, one of which is hydrodesulfurization, wherein a hydrogen flow is exposed to the feedstock in the presence of a suitable catalyst so that sulfur compounds react to produce a volatile product, hydrogen sulfide.

Such processes do provide substantial reduction in sulfur in the feed. However, existing facilities do not readily provide for reduction of sulfur content to desired levels. Known hydrodesulfurization methods include cocurrent processes, wherein hydrogen and hydrocarbon feed are fed through a reactor or zone in the same direction, and countercurrent processes wherein hydrocarbon is fed in one direction and gas is fed in the other direction.

Known cocurrent processes do not provide acceptable levels of sulfur removal, and countercurrent processes typically experience difficulty in reactor flooding which occurs when the desired amount of gas flow to the reactor prevents flow of the hydrocarbon in the counter direction. Reduction of gas flow to address flooding reduces the effectiveness of countercurrent hydrodesulfurization processes.

Another potential problem with countercurrent processes is that adiabatic countercurrent processes may operate at temperatures much higher than adiabatic cocurrent processes, and this temperature is detrimental to hydrodesulfurization and other catalysts used in the process.

Based upon the foregoing, it is clear that the need remains for an advantageous process for removal of sulfur to levels which will meet the expected regulations on hydrocarbons for use as fuel.

It is also clear that the need remains for an improved process whereby flooding and temperature issues can be resolved.

It is therefore the primary object of the present invention to provide a process whereby sulfur content is advantageously reduced to less than or equal to about 10 wppm.

It is a further object of the present invention to provide a process which can be carried out without substantially increasing the equipment size and space occupied by same in current hydroconversion systems.

It is still another object of the present invention to provide a hydroconversion system which accomplishes the aforesaid objectives.

Other objects and advantages of the present invention will appear hereinbelow.

SUMMARY OF THE INVENTION

In accordance with the present invention, the foregoing objects and advantages have been readily attained.

In accordance with the invention a process is provided for upgrading a hydrocarbon feedstock, which process comprises the steps of providing a hydrocarbon feed having an initial characteristic; providing a first hydrogen-containing gas; feeding said hydrocarbon feed and said first hydrogen-containing gas cocurrently to a first hydroprocessing zone so as to provide a first hydrocarbon product; providing a plurality of additional hydroprocessing zones including a final zone and an upstream zone; feeding said first hydrocarbon product cocurrently with a recycled gas to said upstream zone so as to provide an intermediate hydrocarbon product; and feeding said intermediate hydrocarbon product cocurrently with a second hydrogen-containing gas to said final zone so as to provide a final hydrocarbon product having a final characteristic which is improved as compared to said initial characteristic.

Still further according to the invention, a system is provided for upgrading a hydrocarbon feed, which system comprises a first hydroprocessing zone containing a hydroprocessing catalyst and having an inlet for cocurrently receiving a hydrocarbon feed and a first hydrogen-containing gas phase; a plurality of additional hydroprocessing zones each containing a hydroprocessing catalyst and including a final zone and an upstream zone, said upstream zone having an inlet for cocurrently receiving a hydrocarbon product from said first hydroprocessing zone and a recycled hydrogen-containing gas phase, said final zone having an inlet for cocurrently receiving a hydrocarbon product from said upstream hydroprocessing zone cocurrently with a second hydrogen-containing gas phase; and a separator for receiving a product from said final hydroprocessing zone and for separating said product into a hydrocarbon phase and said recycled hydrogen-containing gas phase.

The process and system of the present invention are particularly well suited for use in treating Diesel, gasoil and other distillate feedstocks to reduce sulfur and also for use in treating naphtha and like feedstocks as well.

Other processes which can be carried out using the flow scheme of the present invention include the combination of hydrodesulfurization in the first reactor and carrying out of a second type of reaction process in the downstream reactor, for example hydrocracking of heavy hydrocarbon feedstocks to lower boiling products; hydrocracking of distillate and higher boiling range feedstocks; hydrogenation of aromatics; hydroisomerization; hydrodewaxing, especially of Fischer-Tropsch waxes; and removal of metal from heavy streams. All of these processes benefit from major removal of product gases such as hydrogen sulfide and ammonia in the inter-reactor gas-liquid separator.

BRIEF DESCRIPTION OF THE DRAWINGS

A detailed description of preferred embodiments of the present invention follows, with reference to the attached drawings, wherein.

DETAILED DESCRIPTION

Figure 1:
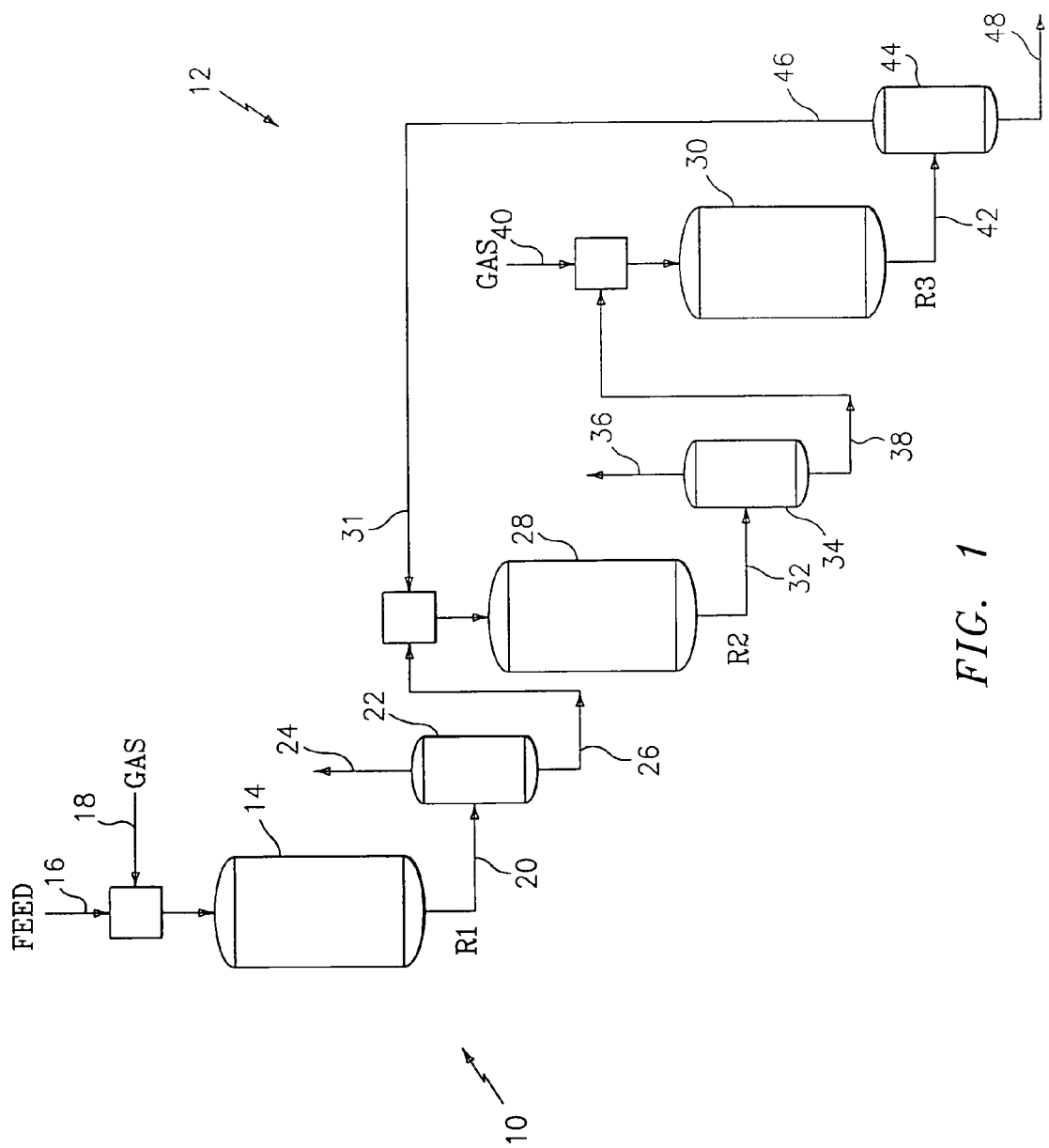
FIG. 1 schematically illustrates a process and system in accordance with the present invention.

In accordance with the present invention, a hydroprocessing process and system are provided for treatment of a hydrocarbon feedstock, for example for removal of contaminants, especially sulfur from a hydrocarbon feed such as Diesel, gasoil, naphtha and the like. A particularly advantageous aspect of the present invention is hydrodesulfurization, and the following detailed description is given as to a hydrodesulfurization process. Of course, the invention is equally suited to processes which involve contacting a hydrocarbon feed with a hydrogen-containing gas to upgrade some other aspect of the feedstock.

The process and system of the present invention in connection with a hydrodesulfurization process advantageously allow for reduction of sulfur content to less than or equal to about 10 wppm, which is expected to satisfy regulations currently proposed by various Government agencies, without requiring substantial expense for new equipment, additional reactors, and the like.

In accordance with the invention, a first hydroprocessing zone is provided along with a plurality of additional hydroprocessing zones, and hydrogen-containing gases fed to these zones so as to advantageously upgrade a hydrocarbon feedstock.

In accordance with one aspect of the present invention, the hydroprocess process carried out in all of these zones is primarily hydrodesulfurization, and the operating perimeters of each zone are tailored toward removal of sulfur in each stage.

In accordance with a further aspect of the present invention, the downstream hydroprocessing zones can be other processes, especially other processes which can benefit from upstream removal of sulfur. In this instance, the first hydroprocessing zone can be a hydrodesulfurization zone, while the downstream hydroprocessing zones can be other types of reaction processes such as hydrocracking, hydrogenation of aromatics, hydroisomerization, hydrodewaxing, metal removal and the like.

It should also be noted that the upstream hydroprocessing zone can be tailored for other hydroprocessing goals such as removal of ammonia ($NH_3$), either as a primary goal or as a secondary goal in addition to removal of sulfur.

In accordance with one embodiment of the present invention, a process is provided which combines a single cocurrently operated hydrodesulfurization reactor with a second stage including a plurality of hydrodesulfurization reactors to obtain a desired result. As will be further discussed below, the second stage includes a plurality of additional hydrodesulfurization reactors or zones and is operated in a globally countercurrent, yet locally cocurrent, mode. This means that when considered on the basis of the reactors overall, the hydrocarbon and hydrogen-containing gas are fed in opposite directions. However, each reactor or zone is coupled so as to flow the hydrocarbon and hydrogen-containing gas in a cocurrent direction within that reactor, thereby providing the benefits of globally countercurrent flow, while avoiding the flooding problems which might be experienced with local countercurrent flow through a reactor or zone.

The reactors within the second stage are arranged such that the hydrocarbon feedstock travels from a first reactor to a last or final reactor, and the hydrogen gas phase travels from the last reactor to the first reactor. In the following detailed description, the group of reactors that are utilized in the second zone are referred to as including a final reactor, from which the finally treated hydrocarbon exits, and upstream reactors which are upstream of the final reactor when taken in connection with the flow of hydrocarbon. Thus, in FIG. 1, reactor 28 is upstream from reactor 30 when considered in light of the direction of hydrocarbon flow, and in FIG. 2, reactor 52 is upstream of reactor 54, and reactor 50 is upstream of both reactors 52 and 54, also when considered in connection with the direction of hydrocarbon flow. Thus, as used herein, an upstream reactor is a reactor which is upstream as it relates to hydrocarbon flow.

In accordance with the present invention, the hydrodesulfurization steps to be carried out are accomplished by contacting or mixing the hydrocarbon feed containing sulfur with a hydrogen gas-containing phase in the presence of a hydrodesulfurization catalyst and at hydrodesulfurization conditions whereby sulfur species within the hydrocarbon convert to hydrogen sulfide gas which remains with the hydrogen gas phase upon separation of liquid and gas phases. Suitable catalyst for use in hydrodesulfurization processes are well known to a person of ordinary skill in the art, and selection of the particular catalyst forms no part of the present invention.

In connection with the gas phase, suitable gas contains hydrogen as desired for the hydroprocessing reaction. This gas may be substantially pure hydrogen or may contain other gases, so long as the desired hydrogen is present for the desired reaction. Thus, as used herein, hydrogen-containing gas includes substantially pure hydrogen gas and other hydrogen-containing streams.

Turning now to FIG. 1, a hydrodesulfurization process in accordance with the present invention is schematically illustrated.

As shown, the process is carried out in a first stage 10 and a second stage 12, so as to provide a final hydrocarbon product having acceptably low content of sulfur.

As shown, first stage 10 is carried out utilizing a first reactor 14 to which is fed a hydrocarbon feed 16 containing an initial amount of sulfur. Feed 16 is combined with a hydrogen-containing gas 18 and fed cocurrently through reactor 14 such that cocurrent flow of hydrocarbon feed 16 and gas 18 in the presence of hydrodesulfurization catalyst and conditions converts sulfur species within the hydrocarbon into hydrogen sulfide within the product 20 of reactor 14. Product 20 is fed to a liquid gas separator 22 where a predominantly hydrogen and hydrogen sulfide containing gas phase 24 is separated from an intermediate product 26. Intermediate product 26 has a reduced sulfur content as compared to hydrocarbon feed 16, and is fed to second stage 12 in accordance with the present invention for further treatment to reduce sulfur content and/or other types of processing as referred to above.

As shown, second stage 12 preferably includes a plurality of additional reactors 28, 30, which are connected in series for treating intermediate product 26 as will be further discussed below. As shown, reactor 28 preferably receives intermediate hydrocarbon feed 26 which is mixed with a recycled hydrogen gas 31 and fed cocurrently through reactor 28. Product 32 from reactor 28 is then fed to a liquid gas separator 34 for separation of a predominately hydrogen and hydrogen sulfide containing gas phase 36 and a further treated liquid hydrocarbon product 38 having a sulfur content still further reduced as compared to intermediate hydrocarbon feed 26. Hydrocarbon feed 38 is then fed to reactor 30, combined with an additional hydrogen feed 40 and fed cocurrently with hydrogen feed 40 through reactor 30 to accomplish still further hydrodesulfurization and produce a final product 42 which is fed to a separator 44 for separation of a gas phase 46 containing hydrogen and hydrogen sulfide as major components, and a final liquid hydrocarbon product 48 having substantially reduced sulfur content.

Alternatively, catalyst and conditions within additional reactors 28, 30 can be tailored to focus predominantly on other types of hydroprocessing reactions, for example hydrocracking, hydrogenation of aromatics, hydroisomerization, hydrodewaxing, removal of metals and the like. The appropriate catalysts for obtaining these processes, as well as the appropriate conditions for same, are well known to a person or ordinary skill in the art.

In accordance with the present invention, gas phase 46 is recycled for use as recycled gas 31 such that gas flowing through the reactors of second stage 12 is globally countercurrent to the flow of hydrocarbon through same. Considering the flow of hydrocarbon from reactor 28 to reactor 30, it is readily apparent that reactor 28 is an upstream reactor and reactor 30 is a final reactor of second stage 12. It should of course be appreciated that additional upstream reactors could be included in second stage 12 if desired, and that second stage 12 preferably includes at least two reactors 28, 30 as shown in the drawings. However, it is a particular advantage of the present invention that excellent results are obtained utilizing the first and second stages as described above with a like number of reactors as are currently used in conventional processes, thereby avoiding the need for additional equipment and space.

It should also be appreciated that although FIG. 1 shows reactors 14, 28 and 30 as separate and discrete reactors, the process of the present invention could likewise be carried out by defining different zones within a collectively arranged reactor, so long as the zones are operated with flow of feed and gas as described above for the first and second stages, with local cocurrent flow through each zone of both stages and globally countercurrent flow through the at least two zones of second stage 12.

Figure 2:
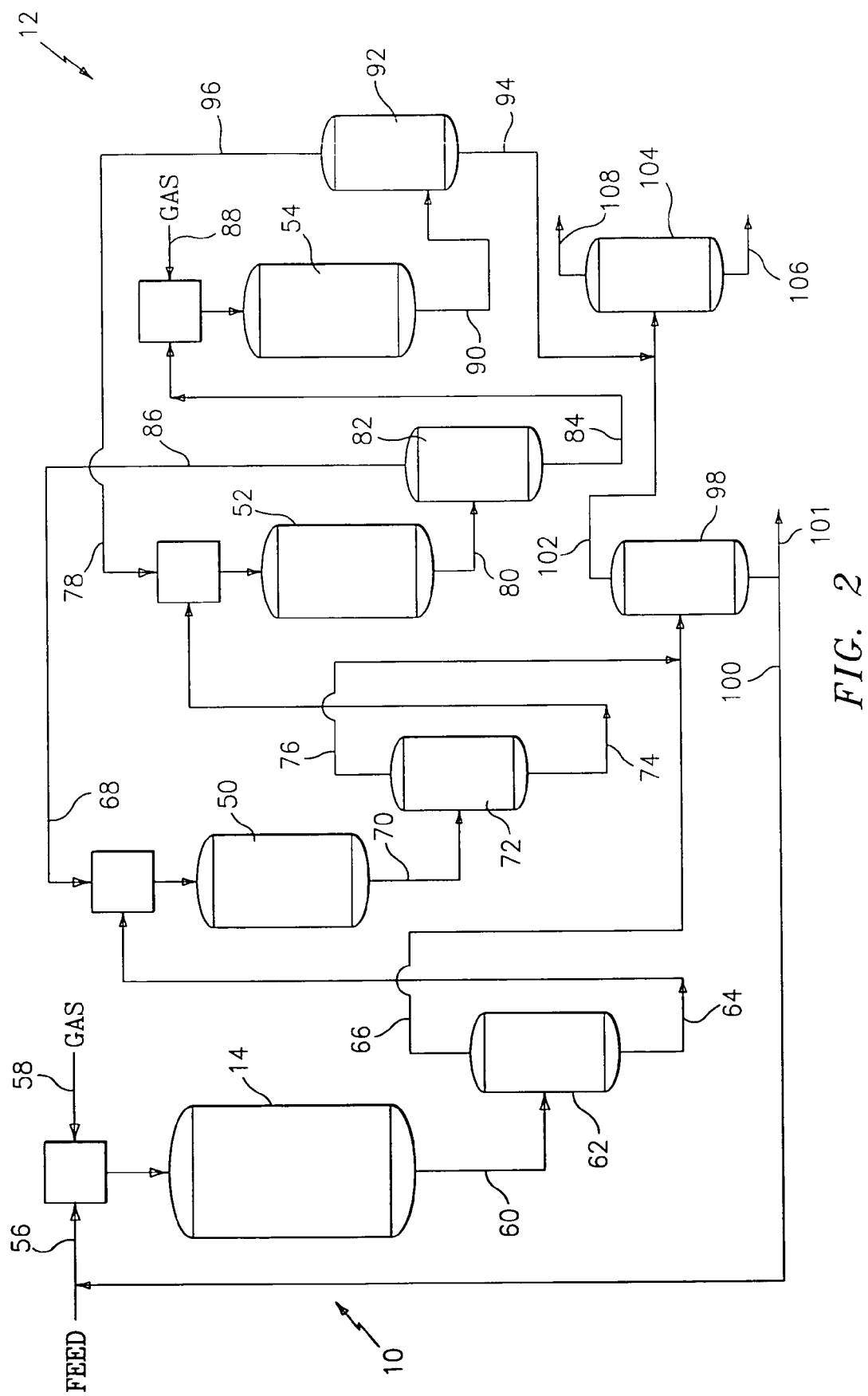
FIG. 2 schematically illustrates an alternative embodiment of the process and system in accordance with the present invention.

Turning now to FIG. 2, a further embodiment of the present invention is illustrated.

As shown, first stage 10 includes a single reactor 14 in similar fashion to the embodiment of FIG. 1.

Second stage 12 in this embodiment includes reactors 50, 52, and 54, and each reactor is operated in a similar fashion to the second stage reactors of the embodiment of FIG. 1 so as to provide a single cocurrent stage in first stage 10 and a globally countercurrent, locally cocurrent process in second stage 12. Thus, feed 56 and fresh hydrogen-containing gas 58 are fed cocurrently to reactor 14 so as to produce product 60 which is fed to separator 62 to produce an intermediate liquid hydrocarbon product 64 and gas phase 66 containing hydrogen and hydrogen sulfide as major components. Intermediate hydrocarbon product 64 is then fed to second stage 12, where it is mixed with recycled gas 68 and fed cocurrently through reactor 50 to produce product 70 which is fed to separator 72. Separator 72 separates a further intermediate liquid hydrocarbon product 74 and a gas phase 76 containing hydrogen and hydrogen sulfide as major components.

Intermediate hydrocarbon product 74 is then combined with recycled hydrogen 78 and fed to reactor 52, cocurrently, so as to produce a further intermediate product 80 which is fed to separator 82 for separation of a further liquid hydrocarbon feed 84 and a gas phase 86 containing hydrogen and hydrogen sulfide as major components which are advantageously fed to upstream reactor 50 as recycled gas 68. Hydrocarbon product 84 is then advantageously combined with a fresh hydrogen feed 88 and fed to last reactor 54, cocurrently, for further hydrodesulfurization so as to provide product 90 which is fed to separator 92 for separation of hydrocarbon liquid phase 94 and gas phase 96 containing hydrogen and hydrogen sulfide as major components. Advantageously, gas phase 96 is fed to upstream reactor 52 and recycled as recycled gas 78 for use in that process, while liquid phase 94 can be treated as a final product, or alternatively can be treated further as discussed below.

In accordance with one aspect of the present invention, a hydrodesulfurization catalyst is present in each reactor, and each successive hydrocarbon product has a sulfur content reduced as compared to the upstream hydrocarbon feed. Further, the final hydrocarbon product has a final sulfur content which is substantially reduced as compared to the initial feed, and which is advantageously less than or equal to about 10 wppm so as to be acceptable under new regulations from various Government agencies.

Further, it should be readily apparent that second stage 12 of the embodiment of FIG. 2 is globally countercurrent, as with the embodiment of FIG. 1. Specifically, hydrocarbon is fed from reactor 50 to reactor 52 and finally to final reactor 54, while gas phase is fed from reactor 54 to reactor 52 and finally to reactor 50. This provides for the advantages of a globally countercurrent process, while avoiding flooding problems which could occur with locally countercurrent processes.

Still referring to FIG. 2, it may be desirable to feed gas phases 66 and 76 to a low temperature separator 98 which operates to remove volatile hydrocarbon product 100, which can be recycled back as additional feed 56 for further treatment in accordance with the process of the present invention, with a purge stream 101 also as shown. Low temperature separator 98 also separates a gas phase 102 which can advantageously be mixed with final product 94 and fed to a final separator 104 so as to obtain a further treated final hydrocarbon product 106 and a final gas phase 108 containing hydrogen and the bulk of removed sulfur. Product 106 can be further treated for enhancing various desired qualities as a hydrocarbon fuel, or can be utilized as hydrocarbon fuel without further treatment, since the sulfur content has been advantageously reduced to acceptable levels.

Final gas phase 108 can advantageously be fed to a stripper or other suitable unit for removal of hydrogen sulfide to provide additional fresh hydrogen for use as hydrogen feeds 58 or 88 in accordance with the process of the present invention.

It should readily be appreciated that FIGS. 1 and 2 further illustrate a system for carrying out the process in accordance with the present invention.

Typical feed for the process of the present invention includes Diesel, gasoil and naphtha feeds and the like. Such feed will have an unacceptably high sulfur content, typically greater than or equal to about 10 wppm. The feed and total hydrogen are preferably fed to the system at a global ratio of gas to feed of between about 500 scfb and about 4000 scfb (std. cubic feet/barrel). Further, each reactor may suitably be operated at a temperature of between about 300° C. and about 420° C., and a pressure of between about 400 psi and about 1500 psi.

In accordance with the present invention, it should readily be appreciated that catalyst volume and gas streams are distributed between the first zone and the second zone. In accordance with the present invention, the most suitable distribution of gas catalyst is determined utilizing an optimization process. It is preferred, however, that the total catalyst volume be distributed between the first zone and the second zone with between about 20 and about 80% volume of the catalyst in the first zone and between about 80 and about 20% volume of the catalyst in the second zone. Further, as discussed above, the total hydrogen is fed to the system of the present invention with one portion to the first zone and the other portion to the final reactor of the second zone. It is preferred that between about 20 and 70% volume of the total hydrogen for the reaction be fed to the first zone, with the balance being fed to the final reactor of the second zone.

It should be noted that as with all hydrodesulfurization processes, the hydrodesulfurization catalyst will gradually lose effectiveness over time, and this can be advantageously countered in the process of the present invention by increasing gas flow rate if desired. This is possible with the process of the present invention because locally cocurrent flow is utilized, thereby preventing difficulties associated with flooding and the like in locally countercurrent processes.

It should also be appreciated that the process of the present invention can advantageously be used to reduce sulfur content of naphtha feed. In such processes, condensers would advantageously be positioned after each reactor, rather than separators, so as to condense the reduced sulfur naphtha hydrocarbon product while maintaining the gas phase containing hydrogen and hydrogen sulfide as major components. In all other respects, this embodiment of the present invention will function in the same manner as that described in connection with FIGS. 1 and 2.

Figure 3:
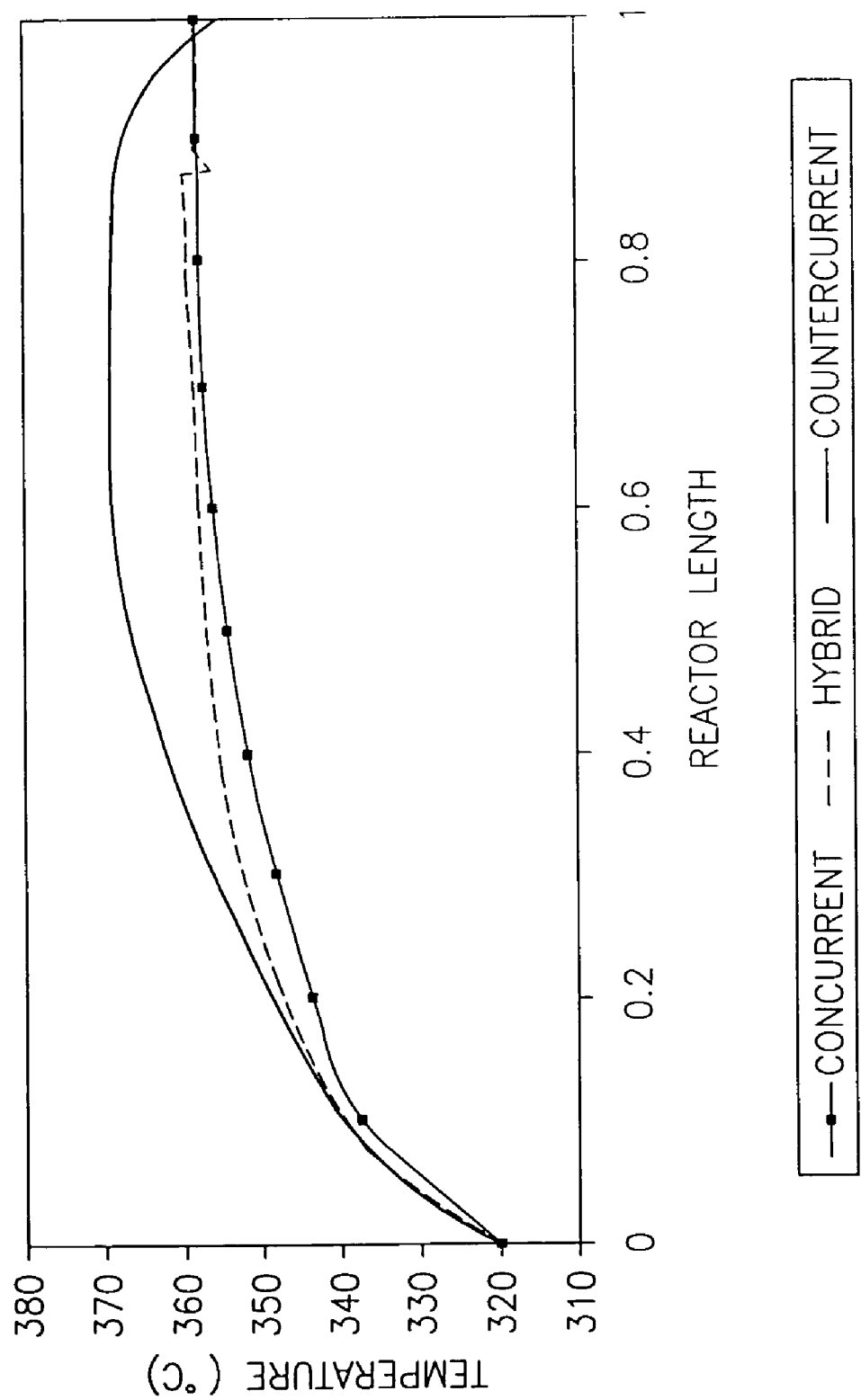
FIG. 3 illustrates the temperature of a process as a function of reactor length for cocurrent and countercurrent processes, as well as the process of the present invention.

Turning now to FIG. 3, and as set forth above, the process of the present invention combining in a hybrid fashion a first stage purely cocurrent reaction and a second stage which is globally countercurrent and locally cocurrent advantageously provides for operation of the reactors at reduced temperatures as compared to countercurrent processes. FIG. 3 illustrates temperature as a function of dimensionless reactor length for a typical cocurrent process, for a countercurrent process, and for a hybrid process in accordance with the present invention. As shown, the temperature in the countercurrent process is substantially higher than the hybrid process of the present invention, with the result that the catalyst of the hybrid process of the present invention is subjected to less severe and damaging conditions.

In accordance with the present invention, improved results are obtained using the same amounts of catalyst and hydrogen as a conventional countercurrent or cocurrent process. In accordance with the present invention, however, the hydrogen feed is divided into a first portion fed to the first stage and a second portion fed to the second stage, and the catalyst volume is also divided between the first stage and second stage, which are operated as discussed above, so as to provide improved hydrodesulfurization as desired.

As set forth above, one particularly advantageous hydrocarbon feed with which the process of the present invention can be used is a gasoil feed. In a typical application, a reactor can be provided having a reactor diameter of about 3.8 meters, a reactor length of about 20 meters, and a cocurrent feed of hydrogen to gasoil at a ratio of hydrogen gas to gasoil of about 270 $Nm^3/m^3$, a temperature of about 340° C., a pressure of about 750 psi and a liquid hourly space velocity (LHSV) through the reactor of about 0.4 $h^{-1}$.

The gasoil may suitably be a vacuum gasoil (VGO) an example of which is described in Table 1 below.

TABLE 1

| API gravity (60° C.) | 17.3 |
| Molecular weight (g/mol) | 418 |
| Sulfur content, % wt | 2 |
| Simulated Distillation (° C.) | |
| IBP/5, % v | 236/366 |
| 10/20, % v | 392/413 |
| 30/50, % v | 431/454 |
| 70/80, % v | 484/501 |
| 90/95, % v | 522/539 |
| FBP | 582 |

For such a feedstock, easy-to-react (ETR) sulfur compounds would be, for example, 1-butylphenantrothiophene. When contacted with hydrogen at suitable conditions, this sulfur compound reacts with the hydrogen to form hydrogen sulfide and butylphenantrene. A typical difficult-to-react (DTR) sulfur compound in such a feed is heptyldibenzothiophene. When contacted with hydrogen gas under suitable conditions, this reacts to form hydrogen sulfide and heptylbiphenyl.

It should of course be appreciated that although the above description is given in terms of hydrodesulfurization processes, the hybrid process of the present invention is readily applicable to other hydroprocessing systems, and can advantageously be used to improve hydroprocessing efficiency in various different processes while reducing problems routinely encountered in the art. Other processes which can be carried out using the flow scheme of the present invention include the combination of hydrodesulfurization in the first reactor and carrying out of a second type of reaction process in the downstream reactor, for example hydrocracking of heavy hydrocarbon feedstocks to lower boiling products; hydrocracking of distillate and higher boiling range feedstocks; hydrogenation of aromatics; hydroisomerization; hydrodewaxing, especially of Fischer-Tropsch waxes; and removal of metal from heavy streams. All of these processes benefit from major removal of product gases such as hydrogen sulfide and ammonia in the inter-reactor gas-liquid separator.

EXAMPLE 1

A VGO feed as described in Table 1 was used with a series of different hydrodesulfurization processes, and conversion of sulfur compounds and sulfur in the final product were modeled for each case. The results are set forth in Table 2 below.

Cases 3 and 10 were also carried out utilizing globally countercurrent and locally cocurrent flow as in stage 2 alone of FIG. 1.

Case 4 was carried out utilizing two reactors with an intermediate hydrogen sulfide separation stage, and case 9 was carried out utilizing pure cocurrent flow, globally and locally, through three reactors.

At the flow rates shown, results were modeled and are set forth in Table 2.

Cases 1–5 were all carried out utilizing reactors having a volume of 322 m$^3$, and at the same time VGO and gas flow rates. As shown, case 5, utilizing the two stage hybrid process of the present invention, provided the best results in terms of conversion of sulfur compounds and sulfur remaining in the final product. Further, this substantial improve-

TABLE 2

| CASE | VGO Flow rate (BBL/D) | Gas Flow rate Nm$^3$/h | CONVERSION % $C_4FT^{(ETR)}$ | $C_6DBT^{(DTR)}$ | % S (wt.) OUTLET | REACTOR VOLUME (m$^3$) | LHSV (h$^{-1}$) |
|---|---|---|---|---|---|---|---|
| CASE 1 | 2000 | 35162 | 94.14 | 75.74 | 0.19 | 322<br>L = 28 m | 0.4 |
| CASE 2 | 20000 | 35162 | 98.79 | 98.37 | 0.0256 | 322<br>R1 = R2 = . . . = Rn<br>L = 28 m<br>n = 20 | |
| CASE 3 | 20000 | 35162 | 99.3 | 95.9 | 0.0271 | 322<br>L = 28<br>R1 = R2 = R3 | 0.4 |
| CASE 4 | 20000 | 35162 | 98.99 | 90.259 | 0.053 | 322<br>L = 28<br>R1 = R2 | 0.4 |
| CASE 5 | 20000 | First 26371.5<br>Last 8790.5 | 99.8 | 97 | 0.016 | 322<br>L = 28 m<br>R = 60% L<br>R2 = R3 = 20% L | 0.4 |
| CASE 6 | 20000 | First 26371.5<br>Last 8790.5 | 99.93 | 99.5 | 0.00317 | 483 | 0.27 |
| CASE 7 | 20000 | 35162 | 99.9 | 99.2 | 0.00313 | L = 133 m<br>1508 | 0.09 |
| CASE 8 | 20000 | First 26371.5<br>Last 8790.5 | 99.9 | 99.7 | 0.0021 | 962 | 0.14 |
| CASE 9 | 20000 | 35162 | 99.9 | 96.4 | 0.0162 | 962<br>R1, L = 28 m, D = 3.8,<br>R2, L-20.86 m,<br>D = 4.42 m,<br>R2, L = 20.86 m,<br>D = 4.42 m | 0.14 |
| CASE 10 | 20000 | 35162 | 99.9 | 99.5 | 0.00312 | 962<br>R1, L = 28 m, D = 3.8,<br>R2, L = 20.86 m,<br>D = 4.42 m,<br>R2, L = 20.86 m,<br>D = 4.42 m | 0.14 | where D = diameter;
R = length of reactor; and
L = total length.

In Table 2, cases 5, 6 and 8 are carried out in accordance with the process of the present invention. For comparison purposes, cases 1 and 7 were carried out utilizing a single reactor through which were fed, cocurrently, VGO and hydrogen.

Case 2 was carried out utilizing 20 reactors arranged for globally countercurrent and locally cocurrent flow as illustrated in the second stage portion of FIG. 1.

ment in hydrodesulfurization was obtained utilizing the same reactor volume, and could be incorporated into an existing facility utilizing any configuration of cases 1–4 without substantially increasing the area occupied by the reactors.

Case 6 in Table 2 shows that by reasonable increase in reactor volume, still further advantageous results can be obtained in accordance with the process of the present invention, and final sulfur content would satisfy the strictest of expected regulations in connection with maximum sulfur content, and this is accomplished through only a small increase in reactor volume.

Case 7 of Table 2 shows that in order to accomplish similar sulfur content results to case 6, a single reactor operated in a single cocurrent conventional process would require almost 4 times the reactor volume as case 6 in accordance with the process of the present invention.

Cases 8, 9 and 10 are modeled for a reactor having a volume of 962 $m^3$, and the hybrid process of the present invention (Case 8) clearly shows the best results as compared to Cases 9 and 10.

In accordance with the foregoing, it should be readily apparent that the process of the present invention is advantageous over numerous alternative configurations.

EXAMPLE 2

In this example, a Diesel feed was treated utilizing several different process schemes and, sulfur compound conversion and sulfur content in the final product were calculated. The Diesel for this example had characteristics as follows:

| Diesel | |
|---|---|
| API = | 27 |
| MW = | 213 |
| Sulfur = | 1.10% wt |
| Simulated Distillation(° C.) | |
| IBP-5 | 177/209 |
| 10–20 | 226/250 |
| 30–40 | 268/281 |
| 50–60 | 294/308 |
| 70–80 | 323/339 |
| 90–95 | 357/371 |
| FBP | 399 |

Table 3 below sets forth the process conditions and results of each case.

Case 2 was carried out feeding Diesel and hydrogen globally countercurrently, and locally cocurrently, through 20 reactors having the same total length and volume as in Case 1.

Case 3 was carried out in accordance with the process of the present invention, utilizing a first single reactor stage and a second stage having two additional reactors operated globally countercurrently and locally cocurrently, with the gas flow rate split as illustrated in Table 3. As shown, the process in accordance with the present invention (Case 3) clearly performs better than Cases 1 and 2 for sulfur compound conversion and final sulfur content while utilizing a reactor system having the same volume. Case 4 is the same as Case 1 and is presented for comparison to Case 5 wherein a process in accordance with the present invention was operated to obtain the same sulfur content from the same reactor volume as the conventional scheme for process so as to illustrate the potential increase in reactor capacity by utilizing the process of the present invention. By adjusting the process to obtain substantially the same final sulfur content, the same reactor volume is able to provide more than double the Diesel treatment capacity as compared to the conventional process.

EXAMPLE 3

Figure 4:
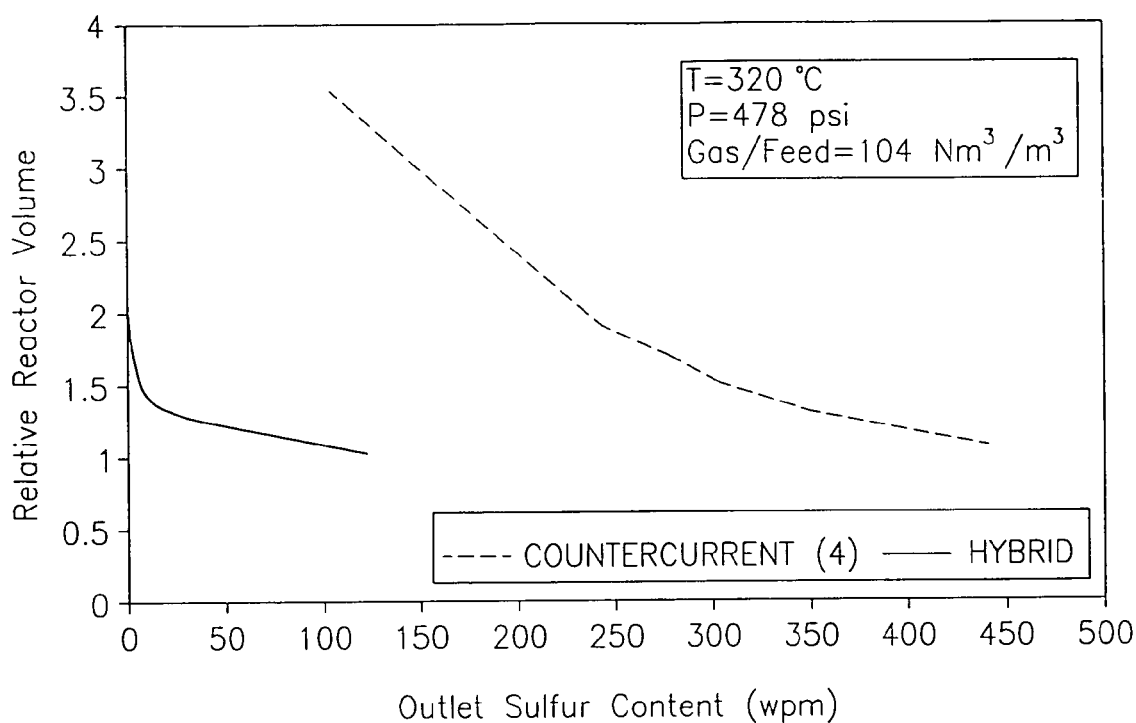
FIG. 4 illustrates the relationship of sulfur content and relative reactor volume for a process according to the present invention and a globally countercurrent process.

In this example, a process in accordance with the present invention was compared to a globally countercurrent and locally cocurrent process. Each process was utilized having 4 reactors with the same catalyst, a Diesel feed, and operating at a temperature of 320° C., a pressure of 478 psi, and a ratio of hydrogen to feed of 104 $Nm^3/m^3$. FIG. 4 shows the results in terms of sulfur content in the final product as a function of relative reactor volume. As shown, the hybrid process of the present invention provides substantially improved results.

EXAMPLE 4

In this example, two processes were evaluated. The first was a process in accordance with a preferred embodiment of

TABLE 3

| CASE | Diesel Flowrate (BBL/D) | Gas Flow rate $Nm^3/h$ | CONVERSION EDBT$^{(ETR)}$ | DMDBT$^{(DTR)}$ | % S (wt) OUTLET | REACTOR VOLUME ($m^3$) | LHSV ($h^{-1}$) |
|---|---|---|---|---|---|---|---|
| CASE 1 | 35000 | 24039 | 96.5 | 81.6 | 0.072 | 370<br>L = 35 m | 0.63 |
| CASE 2 | 35000 | 24039 | 93.72 | 93.44 | 0.07 | 370<br>R1 = R2 ... = Rn<br>L = 35 m<br>n = 20 | 0.63 |
| CASE 3 | 35000 | First 18029<br>Last 6010 | 99.28 | 96.8 | 0.0135 | 370<br>L = 35 m<br>R1 = 60% L<br>R2 = R3 = 20% L | 0.63 |
| CASE 4 | 35000 | 24039 | 96.52 | 81.6 | 0.072 | 370<br>L = 35 m | 0.63 |
| CASE 5 | 72000 | First 37097<br>Last 12366 | 96.08 | 82.53 | 0.074 | 370<br>L = 35 m | 1.3 |

Figure 5:
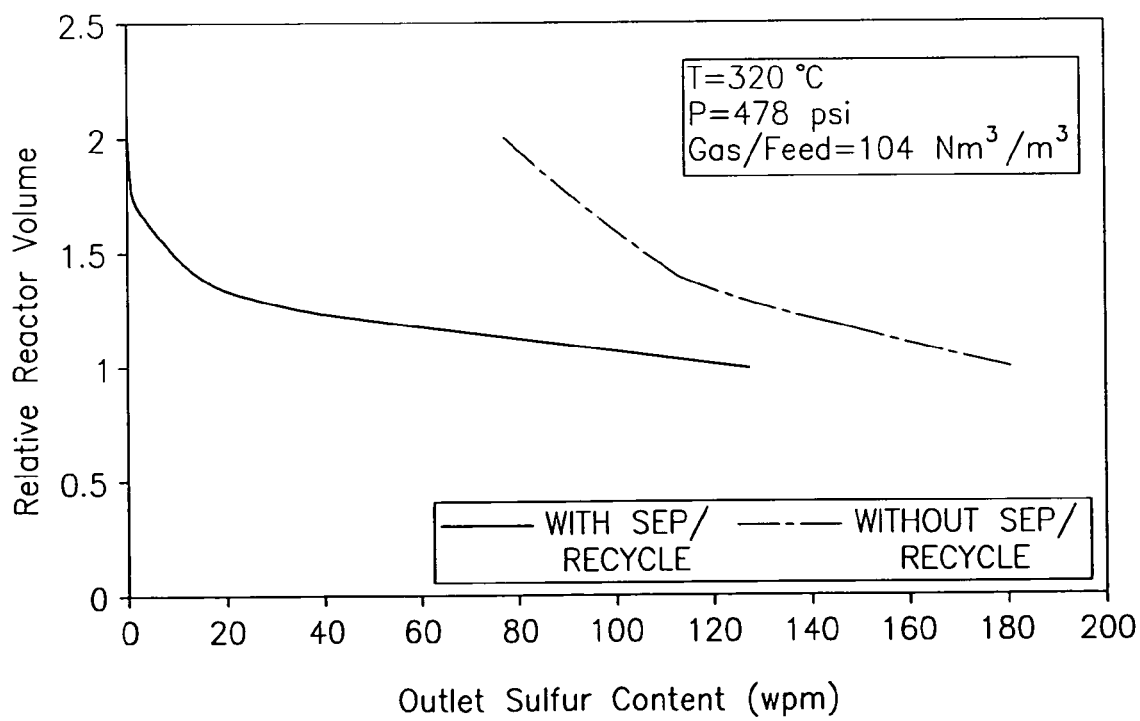
FIG. 5 illustrates sulfur content as a function of relative reactor volume for processes according to the present invention with and without cold separator recycling.

Case 1 of Table 3 was carried out by cocurrently feeding a Diesel and hydrogen feed through a single reactor having the shown length and volume.

the present invention wherein cold separators were positioned after each reactor for recycling condensed vapors. For the same reactors, feed, temperature, pressure and hydrogen/ feed ratio, FIG. 5 illustrates the relation between final sulfur content and relative reactor volume for a process in accordance with the present invention using cold separators (curve 1), as compared to a process in accordance with the present invention without cold separators (curve 2). As shown, the use of cold separators provides additional benefit in reducing the final sulfur content by allowing sufficient hydrodesulfurization of all sulfur species, even those that go into the gas phase.

EXAMPLE 5

Figure 6:
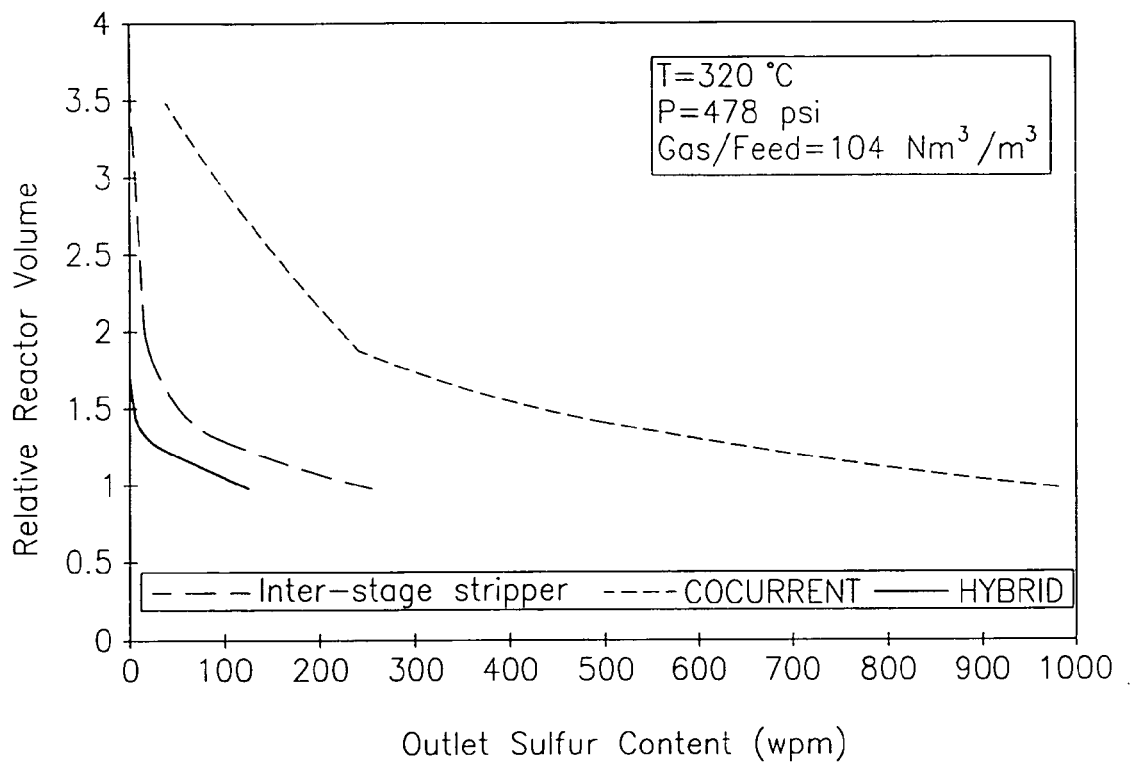
FIG. 6 illustrates the relationship between outlet sulfur content and relative reactor volume for a process according to the present invention, a pure cocurrent process, and a two-reactor inter-stage stripping process.

In this example, a comparison is presented showing final sulfur content as a function of relative reactor volume for a conventional cocurrent process, for a two stage process using an inter-stage stripper, and for a process in accordance with the present invention. The feedstock, temperature, pressure and hydrogen/feed ratio were maintained the same, and the results are illustrated in FIG. 6. As shown, the process of the present invention provides better results in terms of final sulfur content than either of the other two processes.

EXAMPLE 6

In this example, the importance of the proper distribution of hydrogen feed to the first stage and second stage in the process of the present invention is demonstrated.

An example is provided to evaluate hydrogen distribution using a hydrogen feed of 50% to the first stage, and a hydrogen feed of 50% to the last reactor of the second stage. This was compared to a case run using the same equipment and total gas volume, with an 80% feed to the first stage and a 20% feed to the second stage.

Figure 7:
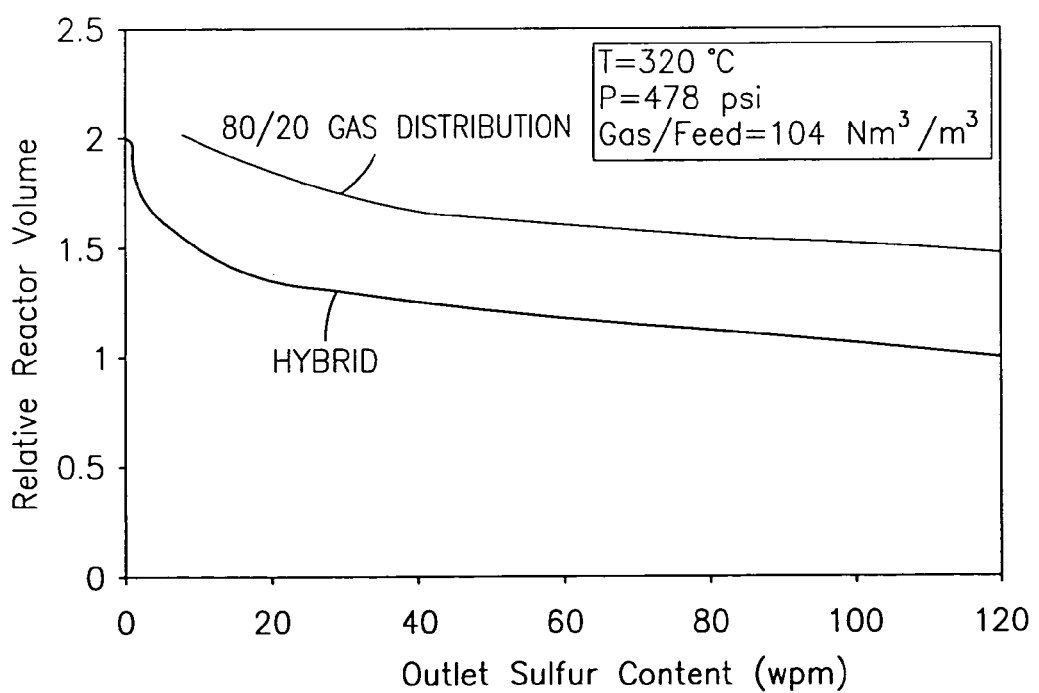
FIG. 7 illustrates the relationship between outlet sulfur content and relative reactor volume for a process according to the present invention and for a process having different ratio of hydrogen distribution.

FIG. 7 shows the results in terms of outlet sulfur content as a function of relative reactor volume for the process in accordance with the present invention and for the 80/20 hydrogen distribution. As shown, in this instance the 50/50 distribution provides better results.

EXAMPLE 7

In this example, the importance of the distribution of catalyst between the first and second stages is illustrated. A four reactor setup in accordance with the present invention, with one reactor in the first stage and three reactors operated globally countercurrent and locally cocurrent in the second stage was used. In one evaluation according to the present invention, 30% of the total catalyst volume was positioned in the first reactor, and 70% of the total catalyst volume was divided equally among the three reactors of the second stage.

For comparison, the same system was operated providing 70% of total catalyst volume in the first stage, and 30% of catalyst volume in the second stage.

Figure 8:
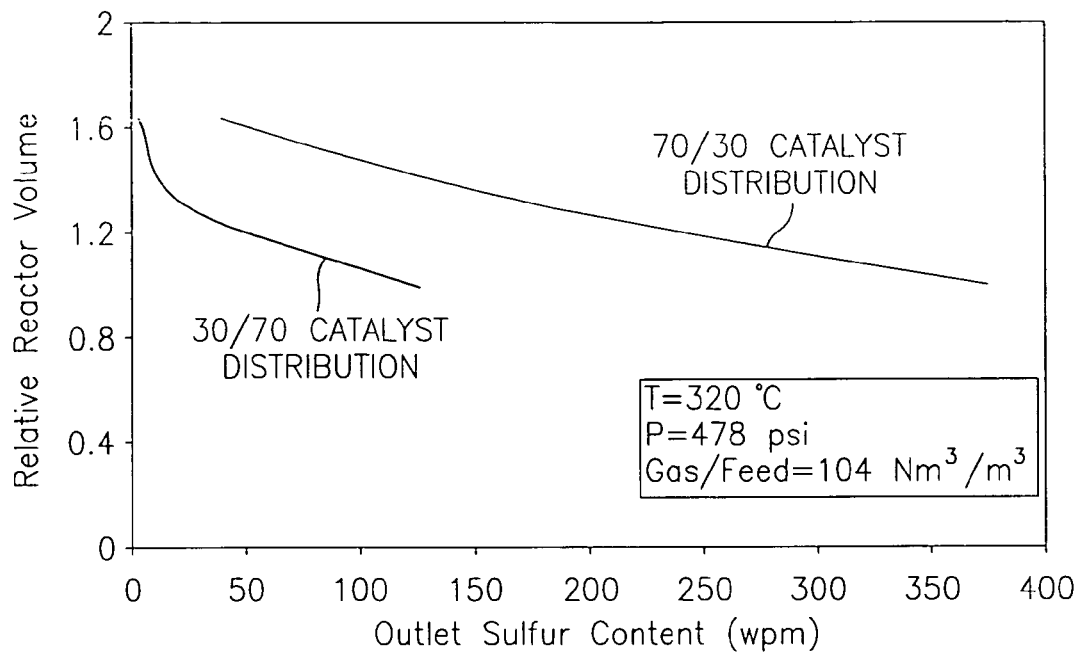
FIG. 8 illustrates the relationship between outlet sulfur content and relative reactor volume for a process according to the present invention and for a process having an inverse distribution of catalyst between first and second stages.

FIG. 8 shows the results in terms of sulfur content as a function of relative reactor volume for the 30/70 process of the present invention as compared to the 70/30 process. As shown, the process of the present invention provides significantly better results.

EXAMPLE 8

In this example, the hydrogen partial pressure was evaluated, as a function of dimensionless reactor length, for a process in accordance with the present invention and for a pure cocurrent process.

Figure 9:
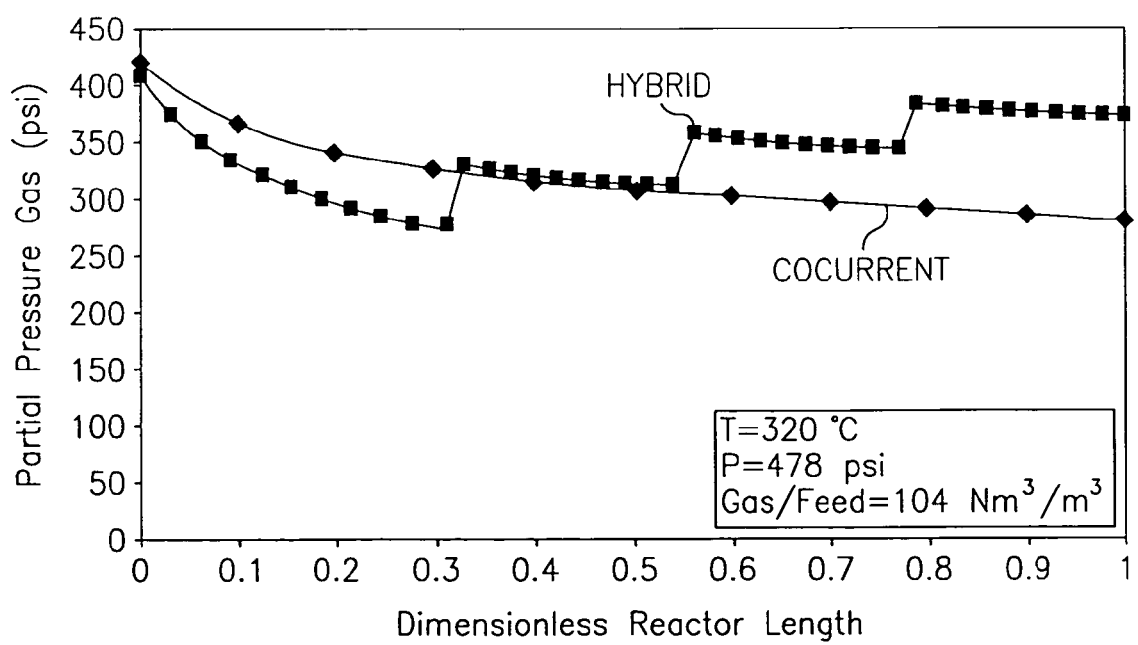
FIG. 9 illustrates the relationship between dimensionless reactor length and hydrogen partial pressure for a process according to the present invention and a pure cocurrent process.

FIG. 9 shows the results of this evaluation, and shows that the process in accordance with the present invention provides for significantly increased hydrogen partial pressure at the end of the reactor, which is desirable. This provides for higher hydrogen partial pressures so as to provide reacting conditions that are most suited for reacting the most difficult-to-react sulfur species, thereby providing conditions for enhanced hydrodesulfurization, particularly as compared to the pure cocurrent case.

EXAMPLE 9

In this example, a comparison is provided for temperature as a function of dimensionless reactor length for a pure cocurrent process, a pure countercurrent process and the hybrid process of the present invention.

Figure 10:
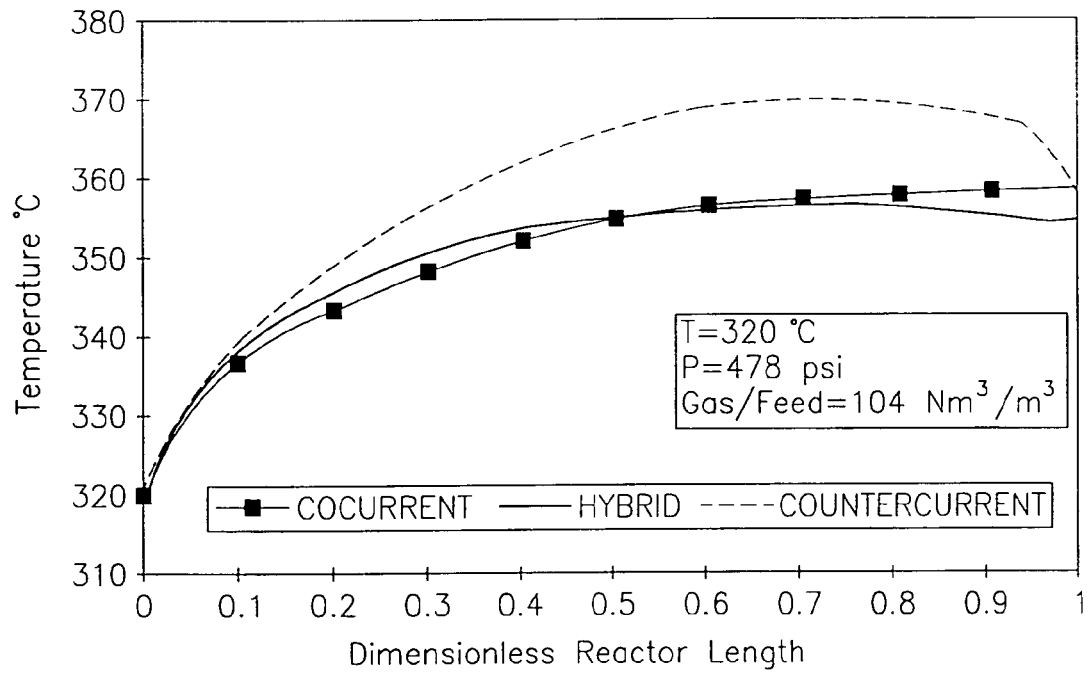
FIG. 10 illustrates the relationship between dimensionless reactor length and reactor temperature for a process according to the present invention as well as pure cocurrent and pure countercurrent processes.

For the same reactor volume, catalyst volume and hydrogen/feed ratio, FIG. 10 shows the resulting temperatures over dimensionless reactor length. As shown, the countercurrent process has the highest temperatures. Further, the hybrid process of the present invention is quite similar in temperature profile to that of the pure cocurrent process, with the exception that there is a slight decrease in temperature toward the reactor outlet.

This is beneficial since the higher temperatures, particularly those experienced with countercurrent process, serve to accelerate catalyst deactivation.

EXAMPLE 10

Figure 11:
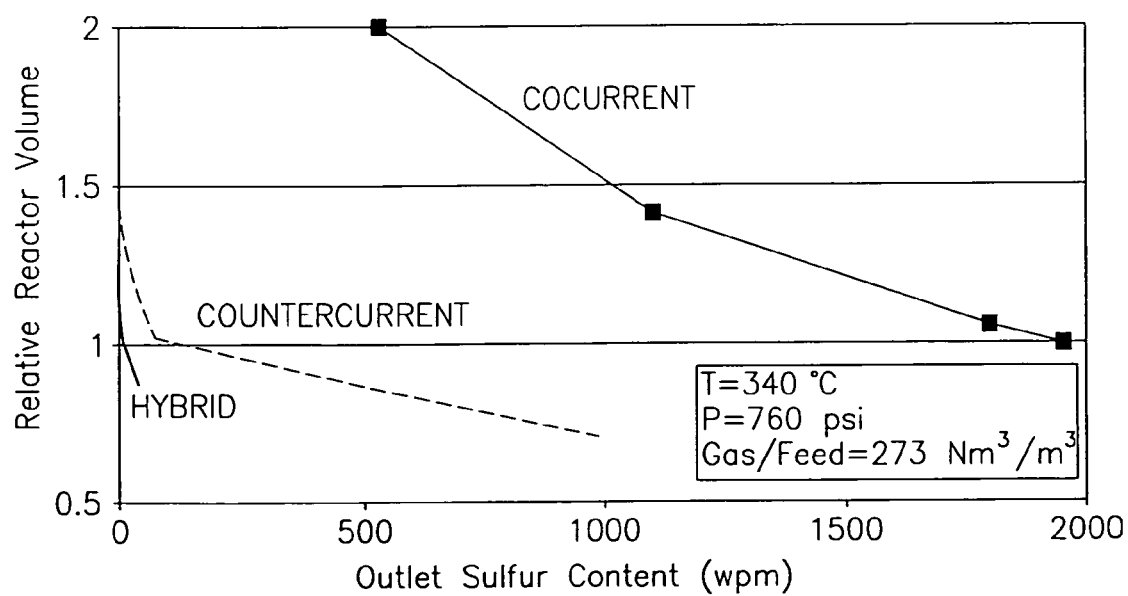
FIG. 11 illustrates the relationship between outlet sulfur content and relative reactor volume for a process according to the present invention as well as a pure cocurrent and pure countercurrent process.

In this example, the sulfur content as a function of relative reactor volume was evaluated for a process in accordance with the present invention, a pure cocurrent process and a globally countercurrent process for a VGO feedstock with a process using a four reactor train, with the same feedstock, and a temperature of 340° C., a pressure of 760 psi and a hydrogen/feed ratio of 273 $Nm^3/m^3$. FIG. 11 shows the results of this evaluation, and shows that the process of the present invention performs substantially better than the pure cocurrent and pure countercurrent processes, especially in the range of resulting sulfur content which is less than 50 wppm.

In accordance with the foregoing, it should be readily apparent that the process and system of the present invention provide for substantial improvement in hydrodesulfurization processes which can be utilized to reduce sulfur content in hydrocarbon feeds with reactor volume substantially the same as conventional ones, or to substantially increase reactor capacity from the same reactor volume at substantially the same sulfur content as can be accomplished utilizing conventional processes.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A process for hydroprocessing a hydrocarbon feedstock, comprising the steps of:
   providing a hydrocarbon feed having an initial sulfur content;
   providing a first hydrogen-containing gas;

feeding said hydrocarbon feed and said first hydrogen-containing gas cocurrently to a first hydroprocessing zone so as to provide a first hydrocarbon product;

providing a plurality of additional hydroprocessing zones including a final zone and an upstream zone;

feeding said first hydrocarbon product cocurrently with a recycled gas to said upstream zone so as to provide an intermediate hydrocarbon product; and feeding said intermediate hydrocarbon product cocurrently with a second hydrogen-containing gas to said final zone so as to provide a final hydrocarbon product having a final sulfur content which is less than said initial sulfur content wherein said final zone also produces a hydrogen-containing gas phase, and further comprising feeding said hydrogen-containing gas phase to said upstream zone as said recycled gas.

2. The process according to claim 1, wherein said final sulfur content is less than or equal to about 10 wppm based upon weight of said final product.

3. The process according to claim 1, wherein said first hydroprocessing zone is a first hydrodesulfurization zone.

4. The process according to claim 3, wherein said additional hydroprocessing zones comprise additional hydrodesulfurization zones.

5. The process according to claim 4, wherein said first hydrodesulfurization zone and said upstream hydrodesulfurization zone each produce a gas phase containing hydrogen sulfide hydrogen and volatile hydrocarbon fractions and further comprising feeding said gas phase to a low temperature separator for separating a liquid phase containing said volatile hydrocarbon fractions and a gas phase containing said hydrogen sulfide and hydrogen, and combining said volatile hydrocarbon fractions with said hydrocarbon feed.

6. The process according to claim 1, wherein said first hydrogen-containing gas and said second hydrogen-containing gas are separate quantities of fresh hydrogen-containing gas, and wherein said recycled gas contains contaminant removed from said intermediate hydrocarbon product.

7. The process according to claim 1, wherein each of said first hydroprocessing zone and said plurality of additional zones contains a hydroprocessing catalyst.

8. The process according to claim 1, wherein said hydrocarbon feed is a Diesel feed.

9. The process according to claim 1, wherein said hydrocarbon feed is a gasoil feed.

10. The process according to claim 1, wherein said hydrocarbon feed is a naphtha feed, and further comprising feeding a product of said first hydroprocessing zone and said plurality of additional hydroprocessing zones to a condenser for providing liquid phase naphtha and gas phase hydrogen and hydrogen sulfide.

* * * * *